Dec. 5, 1967
T. T. LUNDE
3,356,057
VESSEL FOR TRANSPORTING LOGS
Filed Dec. 3, 1965
3 Sheets-Sheet 1
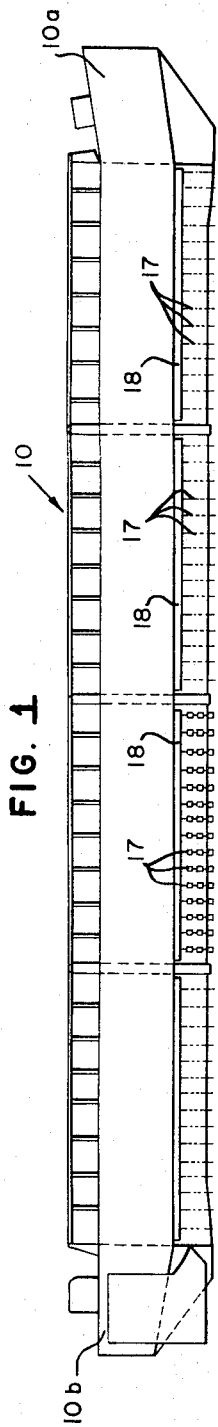
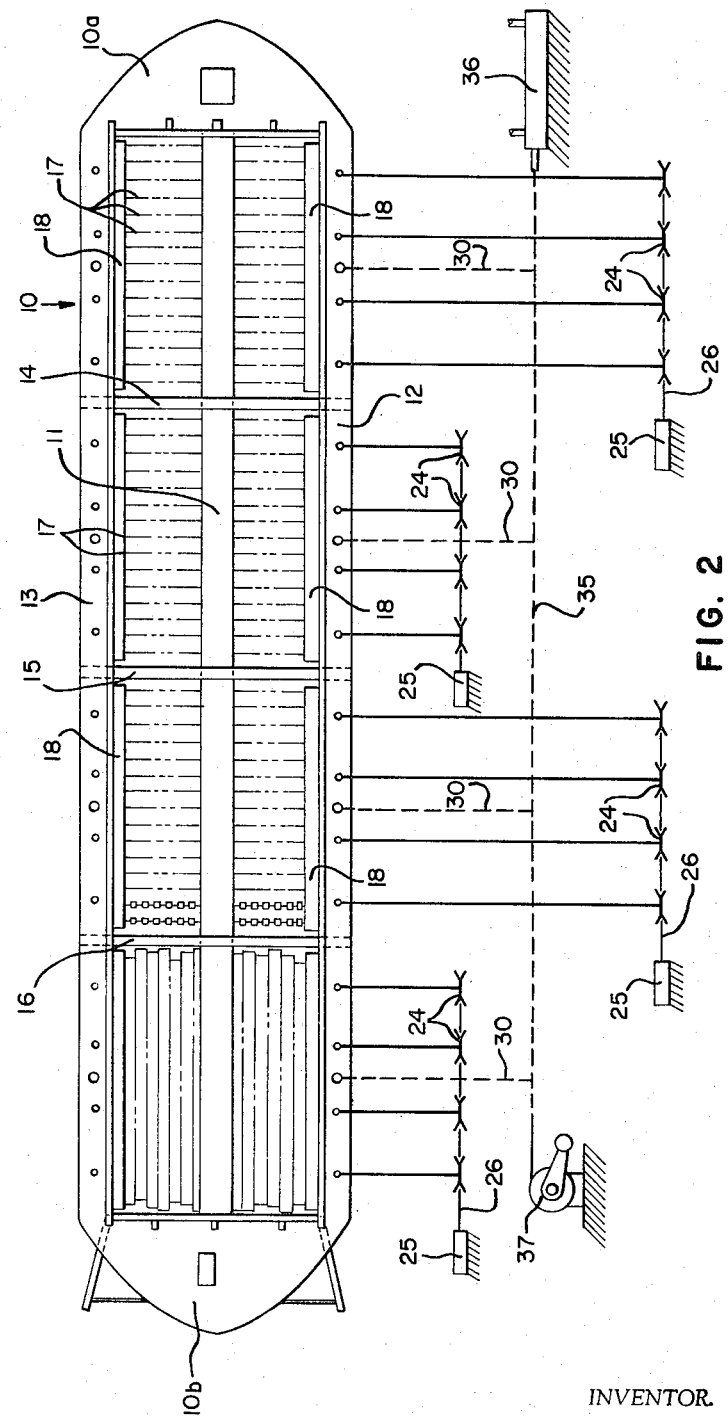
INVENTOR.
THOMAS T. LUNDE
ATTORNEYS Dec. 5, 1967 T. T. LUNDE 3,356,057
VESSEL FOR TRANSPORTING LOGS
Filed Dec. 3, 1965 3 Sheets-Sheet 2

INVENTOR.
THOMAS T. LUNDE
BY Hopper, Mitchell Mueller
and Anderson
ATTORNEYS

INVENTOR.
THOMAS T. LUNDE
BY
ATTORNEYS

United States Patent Office 3,356,057
Patented Dec. 5, 1967

3,356,057
VESSEL FOR TRANSPORTING LOGS
Thomas T. Lunde, San Francisco, Calif., assignor to Lunde Carriers, a limited partnership
Filed Dec. 3, 1965, Ser. No. 526,639
4 Claims. (Cl. 114—27)

This invention relates generally to log barges and vessels for moving buoyant articles over water. The invention is more particularly directed to an improvement in a vessel for transporting logs over the ocean while the logs themselves are supported, at least in part, by their own buoyancy.

It is recognized that log carriers and barges have previously been constructed which utilize the buoyancy of the logs themselves as a means for supporting the logs as they are transported over water. For example, it has been customary to move logs over water in log booms or rafts held together by a chain of logs which surround and contain other logs. A second type of log raft has been made by binding logs together in cylindrical bundles. Both types of log rafts require the use of large amounts of wire or chain, and much time and labor is needed both in forming the rafts and in breaking them down. Moreover, the use of such rafts is limited to inland waters either because of danger in their being broken up by storms or because of difficulty in towing through rough water.

Several log carriers have also been devised which use the buoyancy of the logs for a portion of the support, the vehicle supplying the balance of support. The earliest known carrier of this type consisted of a floating bin having a gate below waterline through which the logs within the bin might be released. Another carrier of more recent development comprises a floating retainer wall having one or more sections pivotally hinged on a vertical axis. The hinged sections operate much the same as a gate which can be latched in a closed position (as to confine the logs) or opened (to release the logs). The sections are held together by chains that provide partial support for the logs while they are being transported.

In addition, of course, other carriers have been used which support the entire weight of the logs. Such carriers, in the form of barges or scows, are usually loaded and unloaded piecemeal, the logs being piled up and chained onto decks which must be strongly constructed to support the entire load. Some of these barges, however, are also constructed so that they may be tipped to roll or slide the logs off the decks, and ballast tanks which can be flooded have been used for that purpose. Barges which support the entire load of logs are normally considered unsuitable for rough water service because the load is delicately balanced on a rolling platform and may tend to capsize.

In brief, the present invention relates to a log barge comprising a continuous wall, or means defining an open bottom enclosure, for receiving and retaining logs. The wall is supported on one side by a float and means is provided for lifting the wall relative to the float as to release logs through the open bottom enclosure. A log support is further contemplated that will span the open bottom of the enclosure and support logs confined by the wall during travel of the log barge, and means is provided for releasably connecting the log support from one side of the enclosure. A preferred form of log support comprises a plurality of flexible supports, such as chains, each support having at least one end that may be disconnected from the barge at the same time as other chains. For this purpose there is provided a pontoon having sufficient buoyancy for supporting at least one-half the weight of the flexible supports with means for releasably latching the pontoon to the barge. Means is further provided for retrieving the pontoon and placing it in a latching position, whereupon each of the flexible supports connected thereto spans the open bottom of the enclosure.

It will be evident from the following detailed description that one object of the present invention is to provide a carrier for buoyant articles or objects, such as logs, and having the ability to be loaded and discharged with a minimum of labor and expense.

Another object is to provide a carrier of the type described that may be inexpensively constructed and operated as compared with carriers of conventional design.

Another object is to provide a log carrier of the kind described which utilizes the buoyancy of the logs themselves to support at least the greater portion of the logs during transportation over water; and a log carrier that may be used on oceans under severe weather and sea conditions.

A still further object of the invention is to provide a log barge or carrier having means defining an open bottom enclosure for receiving and retaining logs that may be lifted relative to a float as to release logs through the open bottom.

A further object is to provide a log barge or carrier of the kind described having a log support that may be used in combination with an open bottom enclosure for partially supporting the logs during travel of the barge but which can be easily removed at the point of destination.

Still another object of the invention is to provide a log barge or carrier of the kind described having an open bottom enclosure, a support means for partially supporting logs within the enclosure, and further comprising means for releasably connecting the log support from one side of the enclosure.

Another object is to provide a log barge or carrier of the kind described having an open bottom enclosure for receiving logs and a log support for partially supporting logs within the enclosure, said support comprising a plurality of flexible supports and means for releasably connecting the ends of a number of supports to the barge at the same time.

It is a still further object of the invention to provide a log barge or carrier of the kind described having an open bottom enclosure, a log support comprising a plurality of flexible supports connected to a pontoon having sufficient buoyancy for supporting at least one-half the weight of the flexible supports, and means for releasably latching the pontoon to the log barge.

A further object is to provide a log barge or carrier of the kind described having an open bottom enclosure for receiving and retaining logs therein, a float extending along one side of the enclosure, and further comprising a ballast tank located on the opposite side of the float from that of the enclossure and having means for selectively filling and discharging the ballast tank with water to produce a list of the barge.

Another object is to provide a log barge or carrier comprising a float extending between sides and longitudinally of the barge, a pair of open bottom enclosures being formed on opposite sides of the float for receiving and retaining logs therein, and means for producing a list of the barge to one side or the other of the float as to release logs through the open bottom of one or the other enclosure.

Other objects of this invention will become apparent in view of the following detailed description and the accompanying drawings.

In the drawings forming a part of this application and in which like parts are identified by like reference numerals throughout the same, FIG. 1 is a side elevation of a preferred embodiment for a log barge constructed in accordance with the teaching of this invention;

FIG. 2 is a plan view of the log barge shown in FIG. 1 together with a schematic diagram of apparatus for latching a log support to the barge and retrieving floating pontoons;

Figure 3:
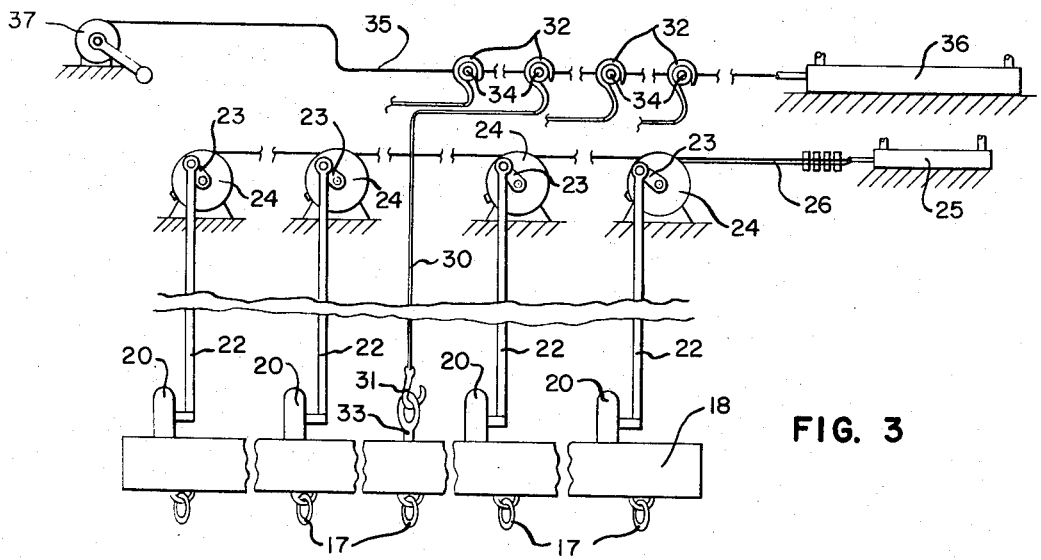
FIG. 3 is a schematic and an elevational view of apparatus for latching a pontoon to the log barge shown in FIGS. 1 and 2 including apparatus for retrieving pontoons and drawing them into latching positions.

Referring to FIGS. 1 and 2 in particular, there is shown a log barge 10 formed with an open bottom and comprising bow and stern ends 10a, 10b, connected together and supported upon a center float tank 11, a starboard ballast tank 12 and a port ballast tank 13. Each of the tanks 11, 12 and 13 extend essentially the full length of the barge. A plurality of bulkheads 14, 15 and 16 divide the barge longitudinally into log corrals or enclosures as defined by the center float tank 11 and one of the ballast tanks 12 or 13. For purposes of explanation, only those corrals nearest to the stern 10b are shown filled with logs, other corrals being illustrated as empty to show the log supporting means which spans the open bottom of the barge and partially supports a cargo of logs in transit. In this connection, a separate log support is provided for each corral comprising a plurality of chains 17, one end of each chain being connected to float tank 11 and the other end being attached to a floating member or pontoon 18. Each pontoon has sufficient buoyancy for supporting at least one-half the weight of those chains connected thereto, and each pontoon may be separately latched to the ballast tank with which it is associated.

FIG. 2 schematically illustrates apparatus for simultaneously retrieving pontoons on the starboard side of the barge and returning them to positions where they can be latched to ballast tank 12. In addition, there is schematically shown apparatus for separately latching each pontoon to the ballast tank or, alternately, releasing the pontoon to discharge logs through the open bottom of an enclosure. It is to be understood that while the apparatus schematically shown in FIG. 2 operates only those pontoons associated with starboard tank 12, the same type of apparatus is also provided for operating pontoons on the port side, which can be latched to tank 13. The form and construction of apparatus schematically shown in FIG. 2 is illustrated with greater detail and particularity in FIGS. 3, 4 and 5.

Figure 4:
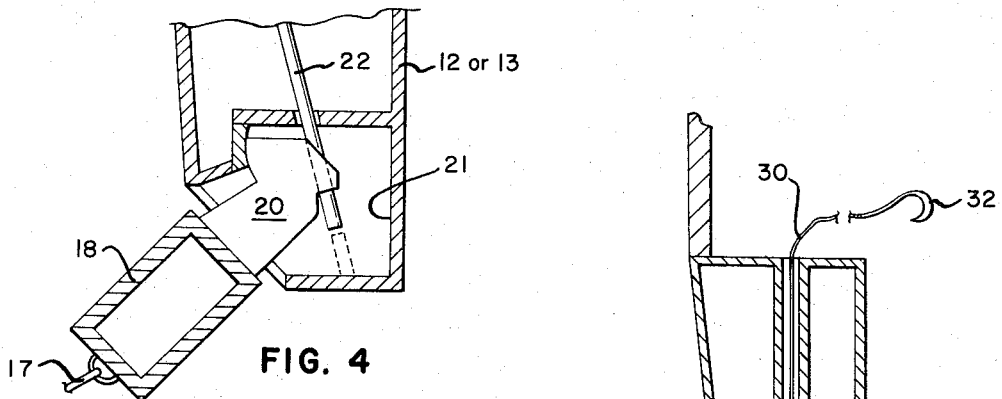
FIG. 4 is a detail and vertical section of the latching means for securing a pontoon to the side of the barge by the apparatus shown in FIG. 3.

With reference to FIGS. 3 and 4, each pontoon 18 is provided with four projecting heads 20 that are received in latch compartments 21 formed in the lower end of each ballast tank. While heads 20 are disposed within compartments 21, they may be latched therein by raising up on a lever 22. Lowering levers 22 into the broken line position shown in FIG. 4 releases the associated head 20, allowing the pontoon to be moved downwardly and away from the ballast tank.

Each lever 22 is pivotally supported on a crank arm 23, and each crank arm is adapted to be pivoted by partial rotation of a pulley 24. Such apparatus provides means for translating the horizontal latching movement of a pressure cylinder 25 into vertical movement of a plurality of levers 22. As illustrated, one pressure cylinder 25 is provided for separately latching each pontoon, and all pressure cylinders may be mounted to the top sides of the ballast tanks.

The latching movement of a cylinder 25, as shown in FIG. 3, is imparted to a series of four cables 26, one end of each cable being connected to the piston of cylinder 25 and the other end entrained partly around a pulley 24 and secured to its periphery. With levers 22 supported in latching positions, it will be noted, the pivot axes of their upper ends, respectively, are off center relative to the axis of an associated pulley. Therefore, the weight of levers 22 (and/or the downward pull exerted thereon through pontoons 18) will move the levers downward and release heads 20 whenever the pressure of cylinder 25 is relieved.

Figure 5:
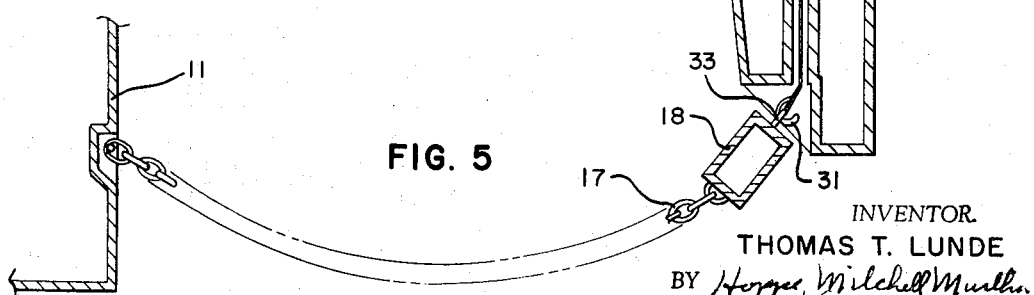
FIG. 5 is a detail and vertical section of a log support chain that spans the open bottom enclosure between a float and one side of the barge, and further showing means for retrieving the pontoon and drawing it into a latching position with the apparatus shown in FIG. 3.

The apparatus for retrieving a pontoon and bringing it into latching position is best shown in FIGS. 3 and 5. For this purpose there is provided a cable 30 for each pontoon. A pair of hooks 31 and 32, secured to opposite ends of each cable 30, allow each cable to be connected between an eye 33 on a pontoon and a connector 34 provided on a draw chain 35.

Referring to FIG. 5, cables 30 extend through vertical guide passageways provided in ballast tanks 12 and 13. Each passageway has a restricted opening which prevents withdrawal of the cables (hooks 31 and 32 being larger than the opening of the passageways). The length of each cable is such that hook 31 may be engaged with the eye 33 of an associated pontoon although the pontoon floats in a position remote from the ballast tank. For example, after a pontoon has been unlatched to discharge a cargo of logs, the pontoon may float toward float tank 11. In such event the length of cable 30 must allow hook 31 to be engaged with eye 33 while hook 32 remains accessible on the barge. Then, once hook 31 is engaged with its eye, the pontoon is drawn toward the ballast tank by pulling on the cable until hook 32 can be engaged with its associated connector 34 on draw chain 35.

Chain 35 is adapted to be moved in a direction longitudinal of the log barge by a pressure operated cylinder 36. This cylinder is actuated after each of the cables 30 on one side of the log barge is connected between its associated pontoon and chain 35. Thus, all pontoons 18 on one side of the barge will be simultaneously drawn into their respective latching positions. Inasmuch as the weight of chain 35, which extends a substantial length of the log barge, would make manual movement thereof difficult, a winch 37 is provided for moving chain 35 in a direction opposite to that produced by cylinder 36. In this manner connectors 34 are returned to positions where they may be engaged with hooks 32 on cables 30.

In addition to the above described apparatus there is provided means for selectively flooding and emptying ballast tanks 12 and 13. For this purpose, conventional apparatus may be used such as a pump and suitable valve connections. Furthermore, it is to be understood that within the broader aspects of this invention, the use of counterweights or other ballast means for lifting a log enclosure may be used in lieu of tanks 12 and 13.

Figure 6:
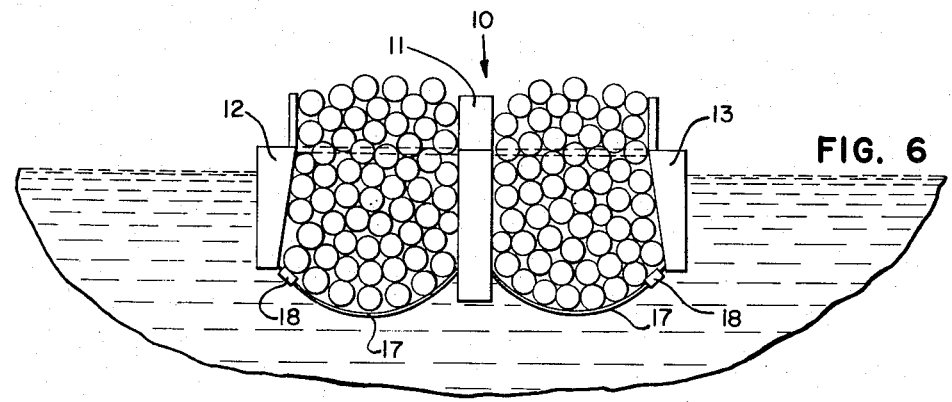
FIGS. 6–8 schematically illustrate sequential steps by which logs are released from the open bottom enclosures of the barge.
Figure 7:
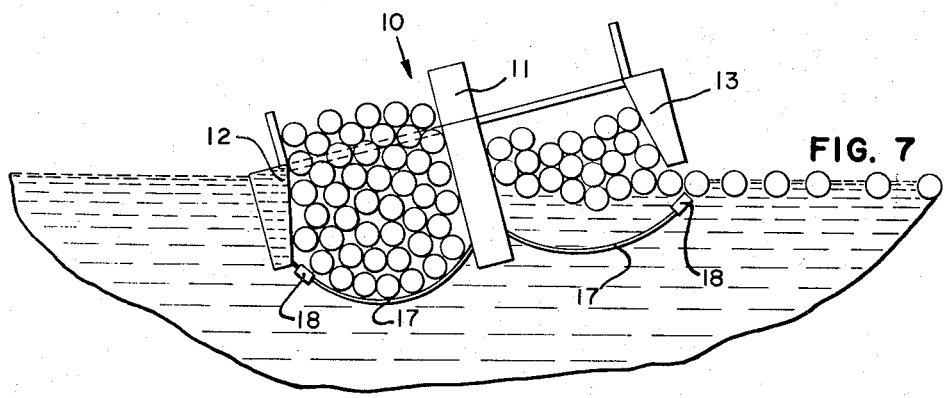
Figure 8:
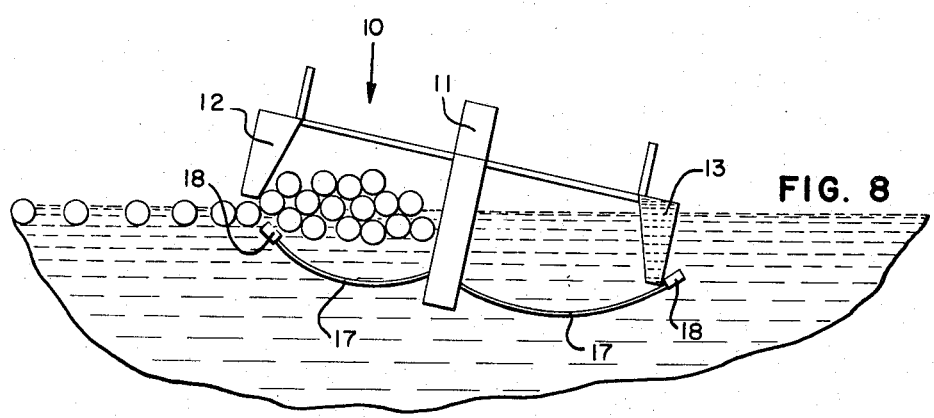

FIGS. 6–8 illustrate the manner in which a loaded log barge 10 discharges its cargo. Initially, one or all pontoons 18 are unlatched from their respective ballast tanks. Then one of the ballast tanks (tank 12 for example) is flooded with water, producing a side list of the barge and lifting the log enclosure between float tank 11 and the opposite ballast tank 13. The logs within the enclosure are thereby allowed to float from beneath the unfilled ballast tank in the manner shown in FIG. 7. Thereafter, flooded ballast tank 12 is emptied and ballast tank 13 is flooded. This produces a side list of the barge in the opposite direction, allowing logs within the corrals between tanks 11 and 12 to float free.

While the majority of the log cargo will be expelled from under the ballast tanks by the weight of other logs supported above, those logs which remain floating within an enclosure may be removed with a log drag.

After all logs have been removed from the corrals, pontoons 18 are retrieved by means of cables 30. Each of the cables on one side of the barge are first drawn downward through their respective passageways in the ballast tank, and then connected to all pontoons 18 on that side. Hooks 32 of those same cables are next attached to the connectors 34 of chain 35, said connectors being brought into position for engagement with the hooks by operating winch 36 and drawing chain 35 longitudinally of the barge. While this is being done, of course, cylinder 36 is depressurized or operated in a manner allowing chain 35 to be moved by the winch. If necessary, pontoons 18 may be drawn manually toward their associated ballast tank to allow hooks 32 to be attached to connectors 34. Final movement of the pontoons into their latching positions (as shown in FIG. 4) is effected by using cylinder 36. Each pontoon is then latched to the ballast tanks by pressurizing cylinders 19, which pull on cables 23, partly rotating drums 22 and lifting latching levers 21.

Although a preferred embodiment of this invention has been illustrated and described, it is to be understood that various changes and modifications may be resorted to without departing from the spirit of the invention or the scope of the attached claims, and each of such changes or modifications is contemplated.

What I claim and desire to secure by Letters Patent is:

1. A vessel for transporting logs comprising: a float extending between sides and longitudinally of said vessel, a pair of ballast tanks extending longitudinally of said vessel and disposed laterally on opposite sides of said float, each ballast tank being laterally spaced from said float and defining open bottom enclosures therebetween, a releasable log support for each enclosure that will span its open bottom, and means for selectively filling and discharging said ballast tanks with water to produce a side list of said vessel and a release of logs through the open bottom of an enclosure.

2. A vessel for transporting logs comprising: a float extending between sides and longitudinally of said vessel, a pair of ballast tanks extending longitudinally of said vessel and disposed laterally on opposite sides of said float, each ballast tank being laterally spaced from said float and defining open bottom enclosures therebetween, means longitudinally dividing the enclosures on both sides of said float into a plurality of log corrals, a releasable log support for each corral that will span the open bottom portion of the associated corral enclosure, and means for selectively filling and discharging said ballast tanks with water to produce a side list of said vessel and a release of logs through the open bottom of corral enclosures.

3. The vessel of claim 2 wherein the log support for each corral comprises a plurality of flexible supports connected at one end to a pontoon, said pontoon having sufficient buoyancy for supporting at least one-half the weight of said log support, and means for releasably latching said pontoon to said vessel.

4. The vessel of claim 3 and further comprising means for simultaneously retrieving the pontoons of each corral on one side of said vessel and returning them to their latching positions.

References Cited

UNITED STATES PATENTS

| 1,863,953 | 6/1932 | Wilband | 114—72 |
| 3,097,622 | 7/1963 | Bell | 114—125 |
| 3,186,369 | 6/1965 | McLennan et al. | 114—37 X |

FOREIGN PATENTS

| 28,614 | 2/1957 | Finland. |

FERGUS S. MIDDLETON, *Primary Examiner.*

MILTON BUCHLER, *Examiner.*

T. MAJOR, *Assistant Examiner.*